United States Patent [19]

Nevin et al.

[11] 4,002,827

[45] Jan. 11, 1977

[54] POLAR COORDINATE FORMAT TO A CARTESIAN COORDINATE FORMAT SCAN CONVERTER

[75] Inventors: Robert Leland Nevin, New Hartford; John Joseph O'Leary, Utica, both of N.Y.; Leonard Joseph Cikotte, Norristown, Pa.

[73] Assignee: General Electric Company, Utica, N.Y.

[22] Filed: May 15, 1975

[21] Appl. No.: 577,971

[52] U.S. Cl. .................. 343/5 SC; 358/140 CR
[51] Int. Cl.² ........................................ H04N 5/02
[58] Field of Search ............. 343/5 SC; 178/7.5 R, 178/68, 7.30

[56] References Cited
UNITED STATES PATENTS

| | | |
|---|---|---|
| 3,633,173 | 1/1972 | Edge .................. 343/5 SC |
| 3,710,175 | 1/1973 | Halpern ............ 343/5 SC |
| 3,765,018 | 10/1973 | Heard ............... 343/5 SC |
| 3,810,174 | 5/1974 | Heard ............... 343/5 SC |
| 3,827,027 | 7/1974 | Towson ............. 343/5 SC |
| 3,904,817 | 9/1975 | Hoffman ........... 343/5 SC |

Primary Examiner—Robert L. Griffin
Assistant Examiner—Edward L. Coles

[57] ABSTRACT

A slow scan radar signal is converted from a polar coordinate format to a cartesian coordinate format to permit the radar signal to be displayed on a television type display device. The radar signal, in analog form, is converted to a digital signal, placed in a memory to permit readout of the data in a cartesian coordinate format and converted from a digital to analog signal which may then be applied to the television type display device.

4 Claims, 7 Drawing Figures

4,002,827

POLAR COORDINATE FORMAT TO A CARTESIAN COORDINATE FORMAT SCAN CONVERTER

Field of the Invention

This invention relates to improved radar signal displays and more particularly to a new and improved radar signal converter for translating slow scan radar data or information from a polar coordinate format to a cartesian coordinate format thus permitting display of the radar data or information on a television type display device.

Background of the Invention

There has been a long felt need for providing data received during use of radar of the Plan Position Indicator type (PPI) in an improved display. The prior art direct displays utilized with PPI radar systems, usually in aircraft, have suffered from annoying windshield wiper effects as well as low brightness.

In one prior art attempt to improve the display of a sector scan radar PPI signal, the signal or data was first displayed on a conventional radar display device to provide a visual display, which display was read by a television type camera and reproduced on a conventional type of television display, much in the manner of a closed circuit television system.

In another prior art attempt to improve or enhance the display of a sector scan radar PPI signal, a scan converter tube utilizes one electron beam to store representation of the radar PPI signal upon an appropriate storage surface, such as is well known in the art, in a polar coordinate format, which polar coordinate format stored signal is then read from the storage surface in a cartesian coordinate format by an electron beam scanning the stored representation of the PPI signal.

Both of the foregoing attempts to improve the radar signals display by converting the originally received radar signal to a cartesian format suffer from inherent problems. One inherent problem relates to the time constants of the elements such as phosphors utilized in the conversion process from a polar to a cartesian format. Another inherent problem resides in the failure to produce the high resolution essential for optimum information display.

Objects of the Invention

It is an object of the present invention to provide an improved display for sector scan radar signals whereby the brightness and clarity of the display is materially enhanced.

It is a further object of the present invention to provide an improved display for sector scan radar signals whereby the resolution of the display is enhanced and a minimum amount of distortion is introduced.

It is a further object of the present invention to provide a new and improved method and means for converting a sector scan polar coordinate radar display into a cartesian coordinate format for display on a conventional type television display device.

The invention is implemented, through proper correlation of timing for writing information received at the output of the radar receiver in a first format into a main memory and reading said information from the main memory in a second format. In particular, means are provided for sampling the radar data and storing it in the main memory under control of a sampling clock that is driven at a repetition rate which is a function of the scan angle. This produces minimum distortion in the converted radar data presentation.

Other features and objects of the invention will be understood by those skilled in the art, when the specification herein is read in conjunction with the drawings herein.

General Description of the Invention

The present invention, as disclosed herein, provides a standard television type display for a radar plan position indicator system. As is well known, the radar plan position indicator system utilizes sector scan techniques taking into account both range and azimuth factors. The display for the radar plan position indicator system was heretofore produced on a display device having a long time constant phosphor which, through utilization of the new and improved scan converter described herein, is replaced by a conventional television type display having a shorter time constant phosphor but a higher refresh rate.

The scan format according to the radar plan position indicator system has conventionally been of a polar coordinate type. In utilizing a television type display device, normally scanned in a cartesian coordinate manner, it becomes necessary to convert the plan position indicator system polar coordinates signal to an equivalent signal capable of being applied to the television type display in a cartesian coordinate manner and more particularly in accordance with the known 525 line 30 frame format.

The conversion of the plan position indicator system signal to a cartesian coordinate format is accomplished through use of a converter wherein the radar receiver output signal is converted from an analog signal to a digital signal with the digital signal quantized for range and azimuth. The quantized digital signal is then read into and temporarily stored in an input buffer memory from whence it is read into and stored in a main memory in a format consonant with the predetermined matrix established for the television display device. Readout from the main memory is through an output buffer memory which accepts the data stored in the main memory in parallel form and provides the data serially, in a manner consistent with the television type display scan parameters, to an output digital to analog signal converter. The analog signal appearing at the analog signal converter output is then applied through appropriate circuitry to the television type display device, which may be a conventional cathode ray tube utilized in household black and white television receivers.

It is further necessary to provide supporting functions for the signal conversion herein above described and this is accomplished through additional circuits including input timing and address counters an output timing and sync generator, a memory controller, an arithmetic processor, a synchro to digital converter for antenna angle information and appropriate sector blanking and cursor generation circuits. All of the foregoing are more fully hereinafter described.

The Drawings

A fuller understanding of the invention may be had by reference to the drawings herein and the description thereof.

Detailed Description of the Invention

Figure 1:
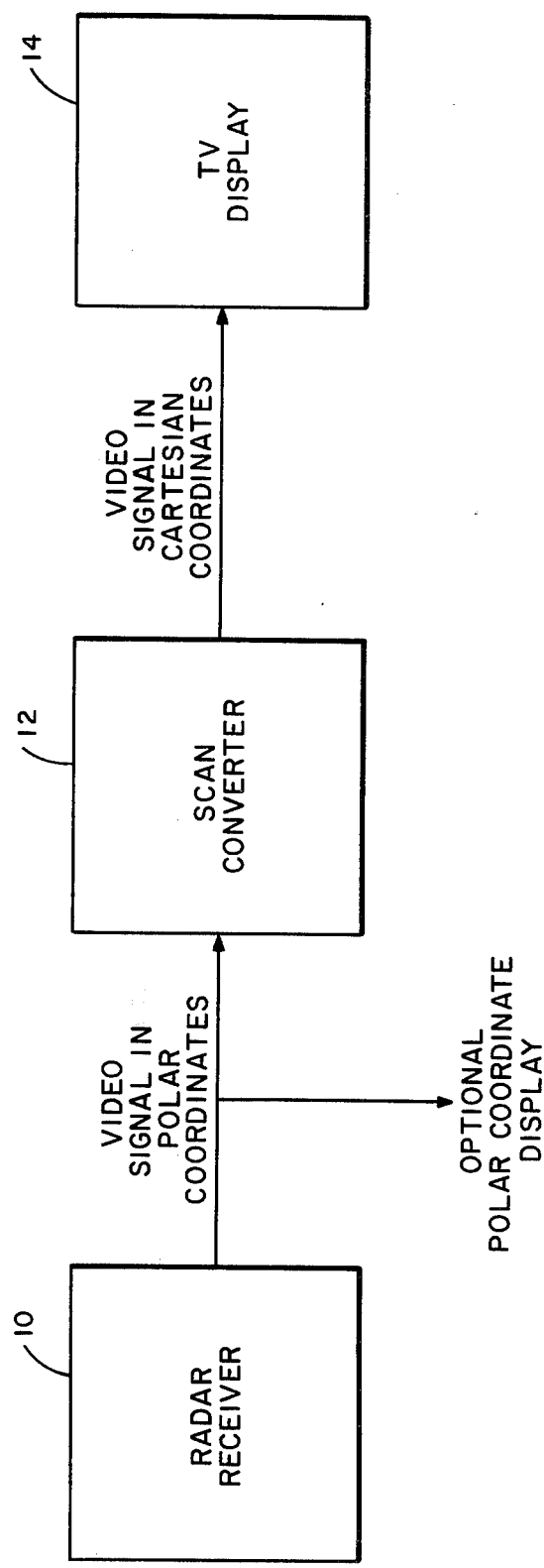
FIG. 1 is a simple block diagram of a system including the invention.

FIG. 1 is a simple block diagram of the invention and shows the radar receiver 10 which provides an output video signal in polar coordinate format to a scan converter 12 which scan converter converts the signal from polar coordinate format into one in cartesian coordinate format. The video output signal from scan converter 12 is fed to conventional television type display device 14 which may be a cathode ray tube as used in black and white television receivers.

The radar receiver and its scanning antenna, not shown for clarity, also supplies additional signals to the scan converter 12 for the purpose of coordinating the various timed operations of the scan converter. The additional signals, which are hereafter referred to, are obtained through circuits well known in the art.

Figure 2:
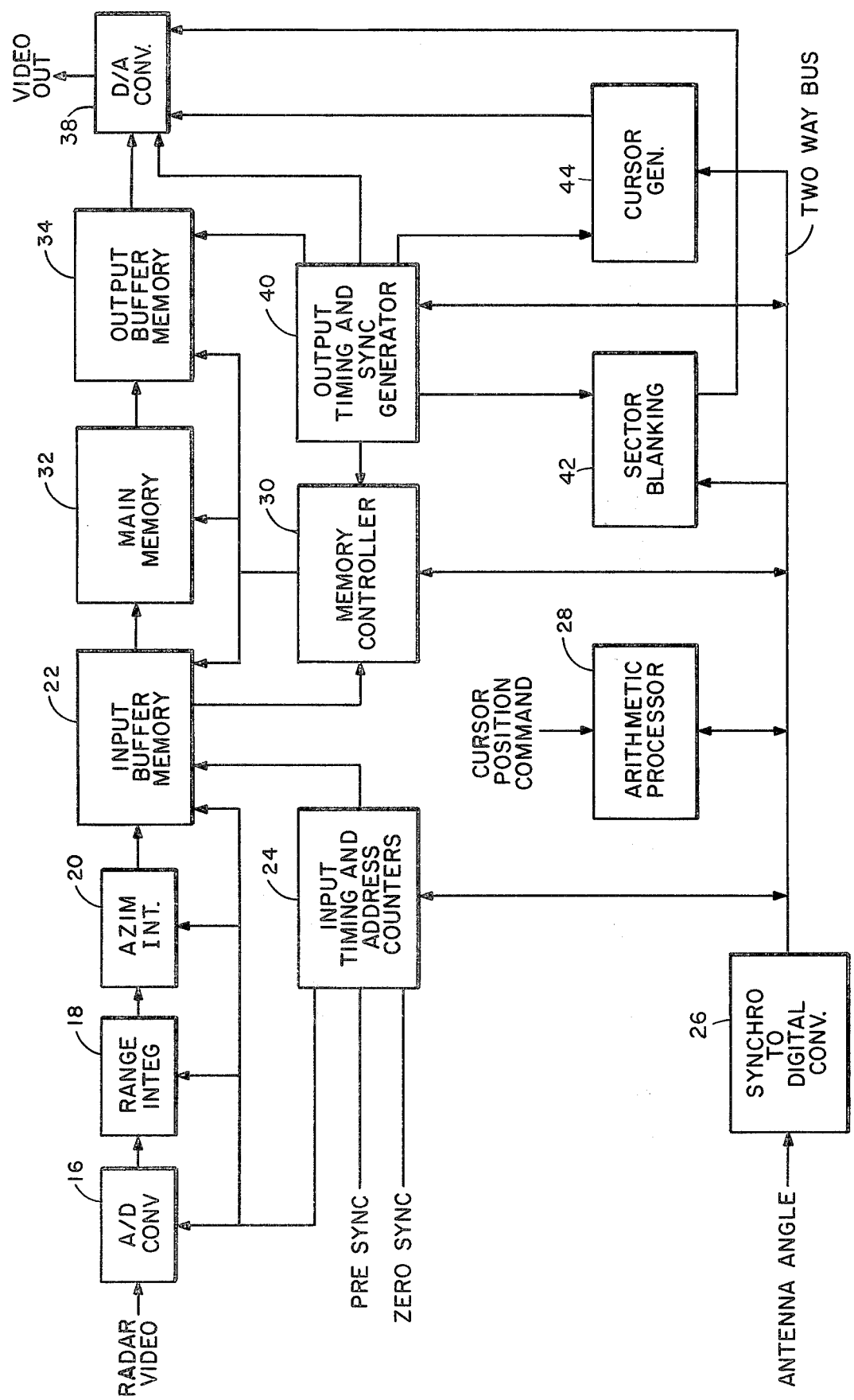
FIG. 2 is a more detailed block diagram of the scan converter utilized with the invention

Referring for further detail to FIG. 2, an analog to digital converter 16 samples the radar video input at a rate commanded by a sample clock. Since the display on the television type display device illustratively is in the nature of a 512 dot per line rate on the Y axis and one data point is to be collected for each increment in the Y dimension, the frequency at which samples are to be taken is caused to vary as the cosine of the antenna angle, or cosine $\theta$. The antenna angle is converted to a digital value by means of a synchro to digital converter 26 the output of which synchro to digital converter 26 is applied to the arithmetic processor.

As the invention herein is described illustratively with respect to a PPI radar signal which is developed in a polar coordinate format which signal format is to be converted to a cartesian coordinate format, the spatial quantization in the conversion can cause deleterious effects on a display in the cartesian format unless adequate corrections are made. The information in digital format from analog to digital converter 16 is first applied to the range integrator 18 which averages the samples taken during each memory interval, representative of a bin to be represented by a dot, and thence to the azimuth integrator 20 which provides a means for smoothing the data and results in giving a good scale "representation" of the data later applied to the TV type display device. The output from the azimuth integrator is applied to the input buffer memory 22 which prepares the data for storage in the proper position in the main memory 32.

The input buffer memory 22 is functionally two sequential memories, each of which sequential memories has a 512 word by 14 bit capacity. The input memory 22 is thus able to alternately accept 512 words of radar data in digital form during radar sweeps. The input buffer memory 22 is able to accept data from the azimuth integrator 20 as the alternate sequential memory part of the input buffer memory 22 transmits data to the main memory 32 at appropriate addresses in the latter.

The main memory 32 is a random access memory for read-in and is preferably of the non-destructive readout type. Main memory 32 is provided with a capacity to store information representative of a matrix having 512 lines, each line having 512 dots. The memory is so constituted that the address of each dot in the memory corresponds to the position the dot will have on the television type display device. In addition to the foregoing it is required that for each dot of the matrix the memory must store a four-bit amplitude number.

To carry out the physical requirements for the main memory 32 of the invention, the memory 32 comprises 1,024 memory integrated circuits each containing 1,024 words by one bit. Each dot in the memory matrix has an X address and a Y address. Each X address is represented by nine bits and each Y address is represented by nine bits for a total 18 bits, 8 bits of which are utilized to select a set of four memory integrated circuits and 10 bits of which are utilized to select a location within the integrated circuits.

The selection of memory locations is organized to permit writing one dot, one column of four dots or one row of four dots during a single memory cycle, as well as reading a row of 64 dots, equivalent to one-eighth of a line on the television type display device, during one memory cycle.

Information from the main memory 32, is read into the output buffer memory 34 which comprises two levels of data buffering each of which holds 64 words of 4 bits. The first level of output buffer memory 32 receives data in parallel from the main memory and forwards the same data in parallel form to the second level of output buffer memory 32, from whence it is fed serially to the output digital to analog converter 38.

The digital information applied to the input of the output digital to analog converter 38 appears as an analog output signal which is suitably fed to the signal control electrode of the television type display device, not shown for purposes of clarity.

The support functions for proper control timing of the radar data being processed from the radar receiver to the television type display device is accomplished in part through use of an arithmetic processor 28 which is a micro-processor of the type well known in the art and having a program to meet the requirements of the system stored in a Read Only Memory thereof. The arithmetic processor 28 develops digital information signals representative of the cosine $\theta$ and tangent $\theta$, the vertex coordinates Xo, Yo, the cursor coordinates Xc, Yc and the slopes and intercepts of blanked areas outside the radar signal sector as well as the end points of the data to be displayed for each line of the television type display device.

Contributing to the proper control timing of the radar data being processed are an input timing and address counter 24, a synchro to digital converter 26, a memory controller 30, output timing and sync generator 40, a sector blanking circuit 42 and a cursor generation circuit 44.

For further proper control timing coordination, the input timing and address counter 24 receives a pre-sync pulse (generated 37 micro-seconds before a transmit sync pulse) and a zero sync pulse both derived from the radar receiver as well as digital data representative of the cosine and tangent of the antenna angle position $\theta$, and supplies appropriate timing and address data to the analog to digital converter 16, range integrator 18, azimuth integrator 20 and input buffer memory 22, in accordance with signals from the arithmetic processor 28.

The main memory 32 is responsive to signals from the memory controller 30 for feeding data into the output buffer memory 34. The main memory controller 30 further coordinates the timing functions of input buffer 22 and output buffer memory 34 in time with signals from the arithmetic processor 28 and the output timing and sync generator 40.

The output timing and sync generator 40 coordinates the proper timing of signals fed from output buffer memory 34 to output digital to analog converter 38 as well as the proper timing from horizontal and vertical scan of the television type display device. The output timing and sync generator 40 further provides partial control of the cursor generation circuit 44. Control of the cursor generation circuit 44 is further properly controlled by signals from the arithmetic processor 28, the memory controller 30, the input timing and address counters 24, and the synchro to digital converter 26.

In implementing the invention illustrative circuits which may be utilized to carry out the data scan conversion are hereinafter detailed.

The Main Memory

Figure 3:
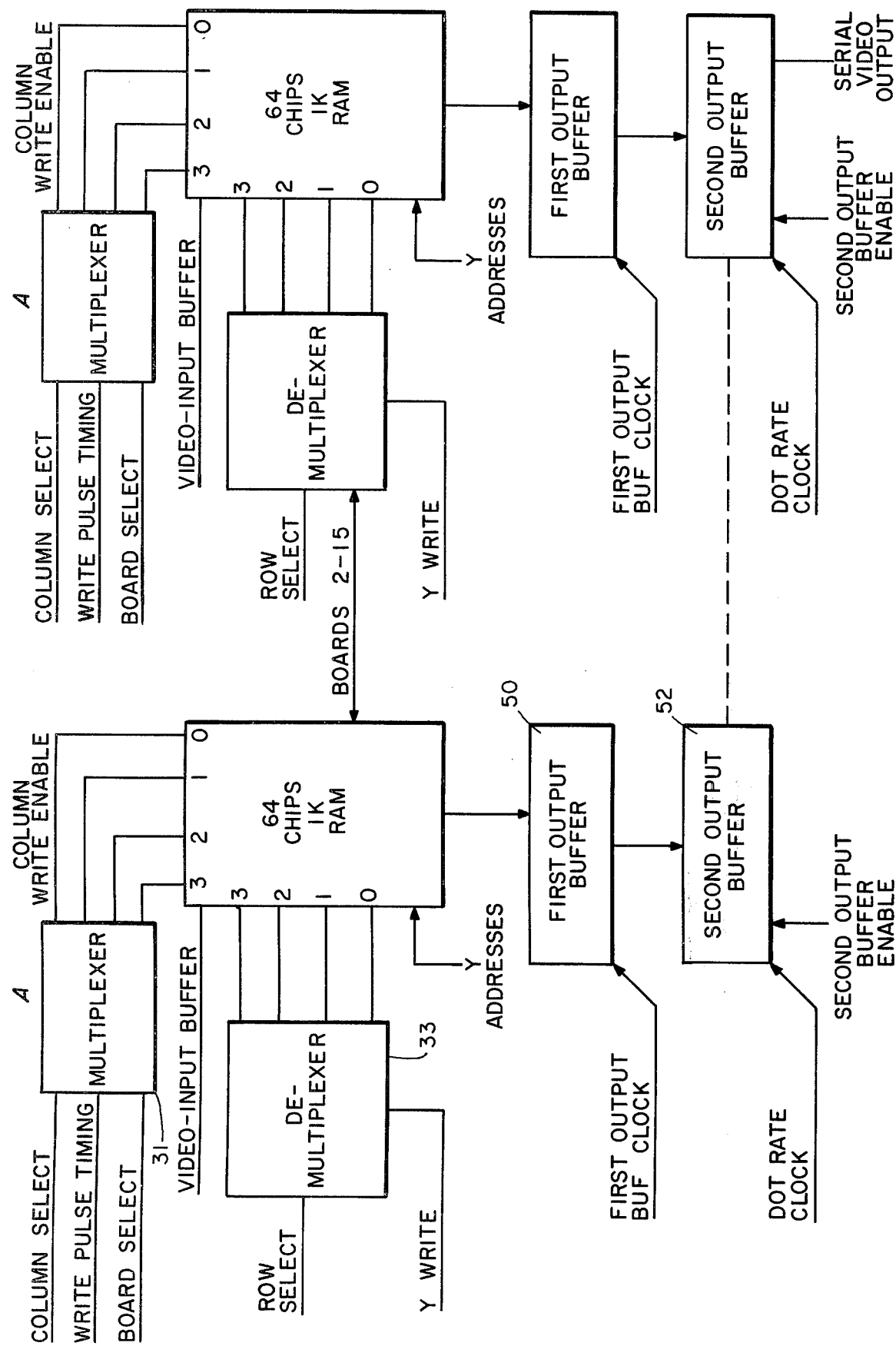
FIG. 3 is a block diagram of the section of the main memory and output buffer memory of FIG. 2 as utilized with one embodiment of the invention.

FIG. 3 is a block diagram of a random access non-destructive readout main memory such as is well known in the art. For simplicity the memory, classified as a megabit memory is organized in the form of 16 like boards A, two of which are shown in block diagram form. Each board is substantially alike having 64 integrated circuit chips in a 4 by 4 by 4 array, wherein each integrated circuit chip is capable of supplying 1,024 words of one bit of storage. If the array is thought of as a three dimensional affair having X, Y and Z planes, the X and Y dimensions represent an address and each related bit in the Z dimension is representative of one bit of a 4 bit binary number which represents the amplitude of the data stored therein. Each storage element will therefor make a contribution to the final display on the television display device which will have a 512 by 512 array, representing 512 dots along the X axis by 512 lines in the y axis. The addresses in the main memory matrix are correlated to the television display matrix such that 1 bin in the memory will correspond to each dot to appear on the television type display device.

Considering each board, the address of a particular chip is determined by the row and column in which it appears. The boards each then have 4 rows and 4 columns, giving an overall array of 16 boards comprising 4 rows by 64 columns.

The coordinates of each dot in the memory consists of a nine-bit X address and a nine-bit Y address. Of the eighteen bits, eight bits are used to select a set of four integrated circuit chips on a board and 10 bits are used to select a location within the integrated circuit chips. The selection for writing into the memory is such that it is possible to write into a single dot, one column of four dots or one row of four dots during a single memory cycle.

With respect to writing into a board, the address is designated when a column select signal is applied through a multiplexer 31 to apply a write enable signal to the appropriate columns designated 0–3 and when a demultiplexer 33 provides a chip enable signal responsive to a write signal. Data from the input buffer memory is applied to the appropriate chips simultaneously with the write address signals.

The column select, board select, and row select signals applied to the main memory are generated from the X- and Y- addresses of the data to be written. This is accomplished by the memory controller 30 in a manner well known in the art.

The main memory 30 is made to write in either a row of four dots, or a column of four dots, in those radar modes during which the rays of the radar sweeps are more widely spaced than the dots in which they are stored. By writing in a row of four, the gap is filled in, and any excess of the four dots, over that which is required to fill the gap, is written over by the next sweep.

Readout from the memory is accomplished by enabling a particular row across all 16 boards and passing the output of the particular information contained in that row to a first output buffer 50 in parallel fashion. The information stored in first output buffer 50 is transferred in parallel fashion to a second output buffer 52 from whence it is read out serially in a fashion well known in the art. As the information is being read out of second output buffer 52, information is being transferred from the main memory 32 to first output buffer 50 at the same time. Upon completion of a serial readout from the second output buffer 52 the information stored in the first output buffer 50 is again inserted into the second output buffer 52 for the serial readout. The 16 boards utilized provide for a one-eighth line or 64 dot readout, and saves time, decreasing the frequency of readout of the memory were each dot to be read out successively from the main memory.

Cosine Clock

Figure 4:
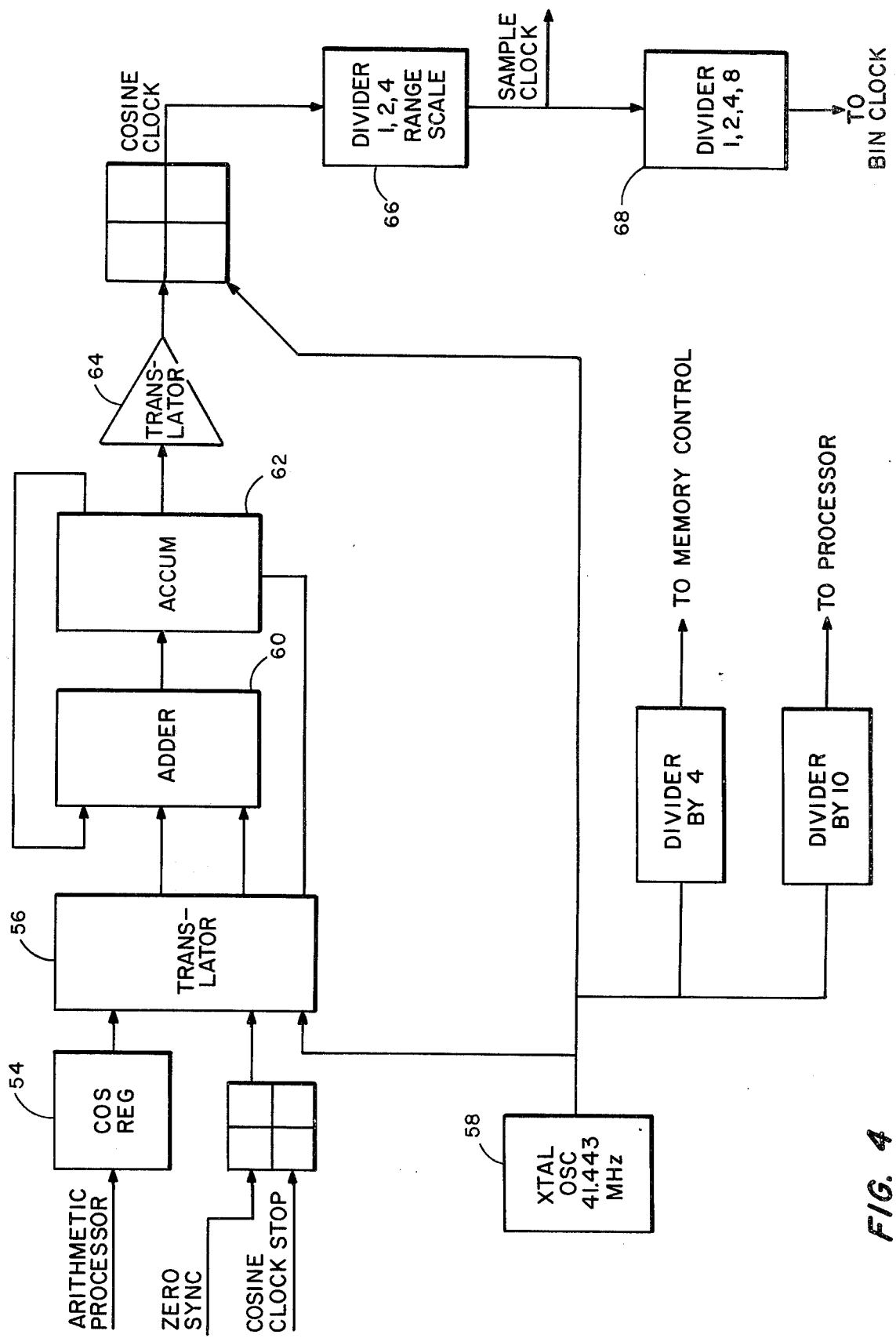
FIG. 4 is a block diagram of a cosine clock which may be utilized with the invention.

To provide signals for the addresses for the purpose of appropriately reading into the memory the invention utilizes, in part, a cosine clock as shown in FIG. 4. The cosine clock comprises a crystal oscillator set at a frequency of 41.443 megahertz which crystal oscillator provides the frequencies for maintaining the distance and display related to one another. The crystal frequency is divided by 4 and applied to the memory control. The frequency is likewise divided by 10 and applied to the arithmetic processor. Data from the arithmetic processor is applied to the input of a cosine register 54 composed of transistor-transistor logic (TTL) the output of which cosine register 54 is applied to a translator 56 which converts the TTL logic to emitter coupled logic (ECL). The translator also converts the output of the crystal oscillator 58 and a aero sync control signal. Signals from the translator 56 are fed to an adder 60 and from adder 60 to an accumulator 62. The output of accumulator 62 is fed to a translator 64 to convert the ECL to TTL so that the most significant bit returns to a 1 at a rate one-fourth of the crystal clock rate X times the cosine $\theta$. The output of the translator 64 under control of the crystal oscillator 58 may optionally be fed to a range scale divider 66 the output of which scale divider 66 is fed as the sample clock to the analog to digital converter, and to a second divider 68 from whence it is fed to the integrators and buffer memory for determining the rate at which samples are stored or placed in the input buffer memory 22.

XY Counters

Figure 5:
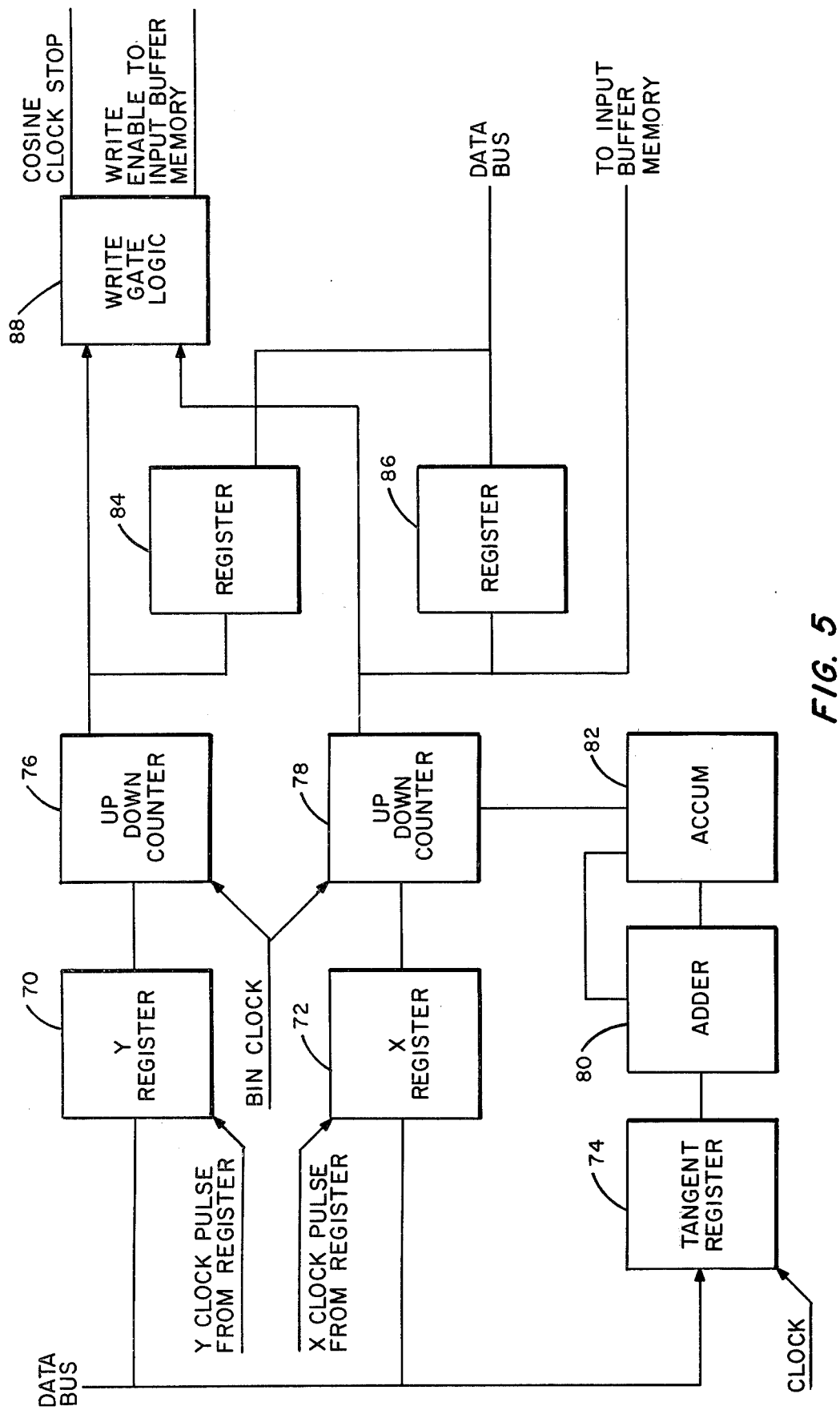
FIG. 5 is a block diagram of a counter which may be utilized in providing addresses for data to be stored in the main memory of FIG. 1.

FIG. 5 illustrates one form of XY counter which may be utilized with the invention. Signals from a data bus are applied simultaneously to a Y register 70, an X register 72 and a tangent register 74. The clock pulses are likewise applied to the Y register 70, X registers 72 and tangent register 74. The output of Y register 70 is fed to Y counter 76. The output of X register 72 is fed to X counter 78. Tangent register 74 is fed to an adder 80 and from adder 80 to an accumulator 82. The output of accumulator 82 provides a signal which is proportional to the tangent multiplied by the cosine, or sine, and is fed to the X counter 78. Both counters 76 and 78 are fed by a signal from a bin clock. Y counter 76 and X counter 78 indicate the position of the current radar data during the radar sweep at any particular time. The output of counter Y is fed to a register 84 and the output of counter 78 is fed to an X register 86. The output of counters of 76 and 78 are also fed to a write gate logic circuit 88. The output of write gate logic circuit 88 provides a write enable signal to the input buffer memory and a cosine clock stop signal to the cosine clock of FIG. 4.

Input Buffer Memory

Figure 6:
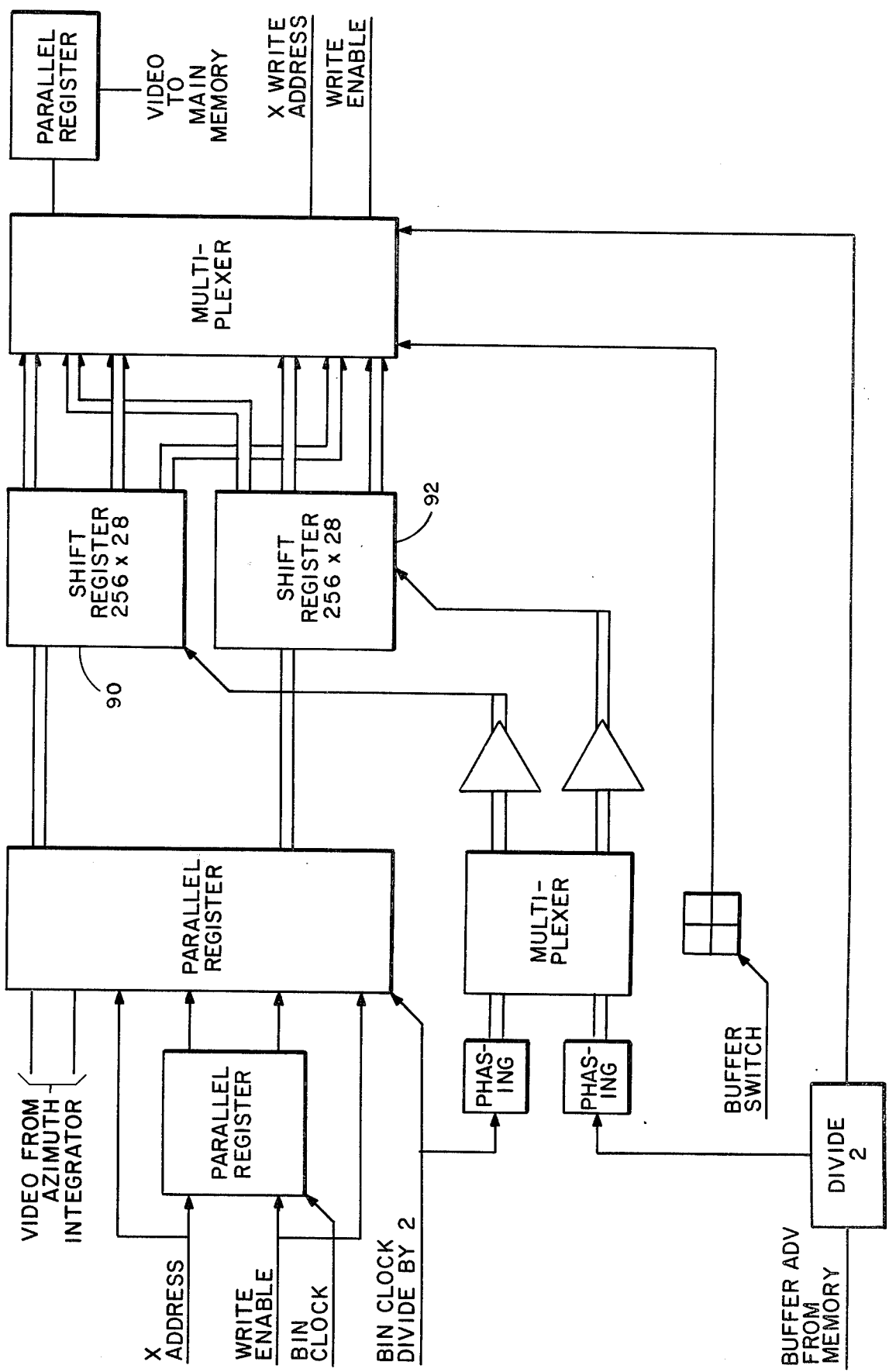
FIG. 6 is a block diagram of an input buffer memory utilized to feed data to the main memory of FIG. 1.

FIG. 6 shows one embodiment of an input buffer memory or queue 22 which comprises two shift registers 90 and 92. Loading of the shift registers 90 and 92 is accomplished through an input parallel register 93 and associated address clocking signals. The use of two shift registers 90 and 92 permits the loading of one shift register with information from analog to digital converter 16 while the second shift register is being unloaded into the main memory 32. The video information and the proper addresses are stored in each shift register until a proper write enable signal and other appropriate signals permit the shift or transfer the temporarily stored data to the main memory 32 in blocks of four data bits at a time. The means for carrying out these functions are well known in the art and therefore not detailed here.

Range Integrator and Azimuth Integrator

Figure 7:
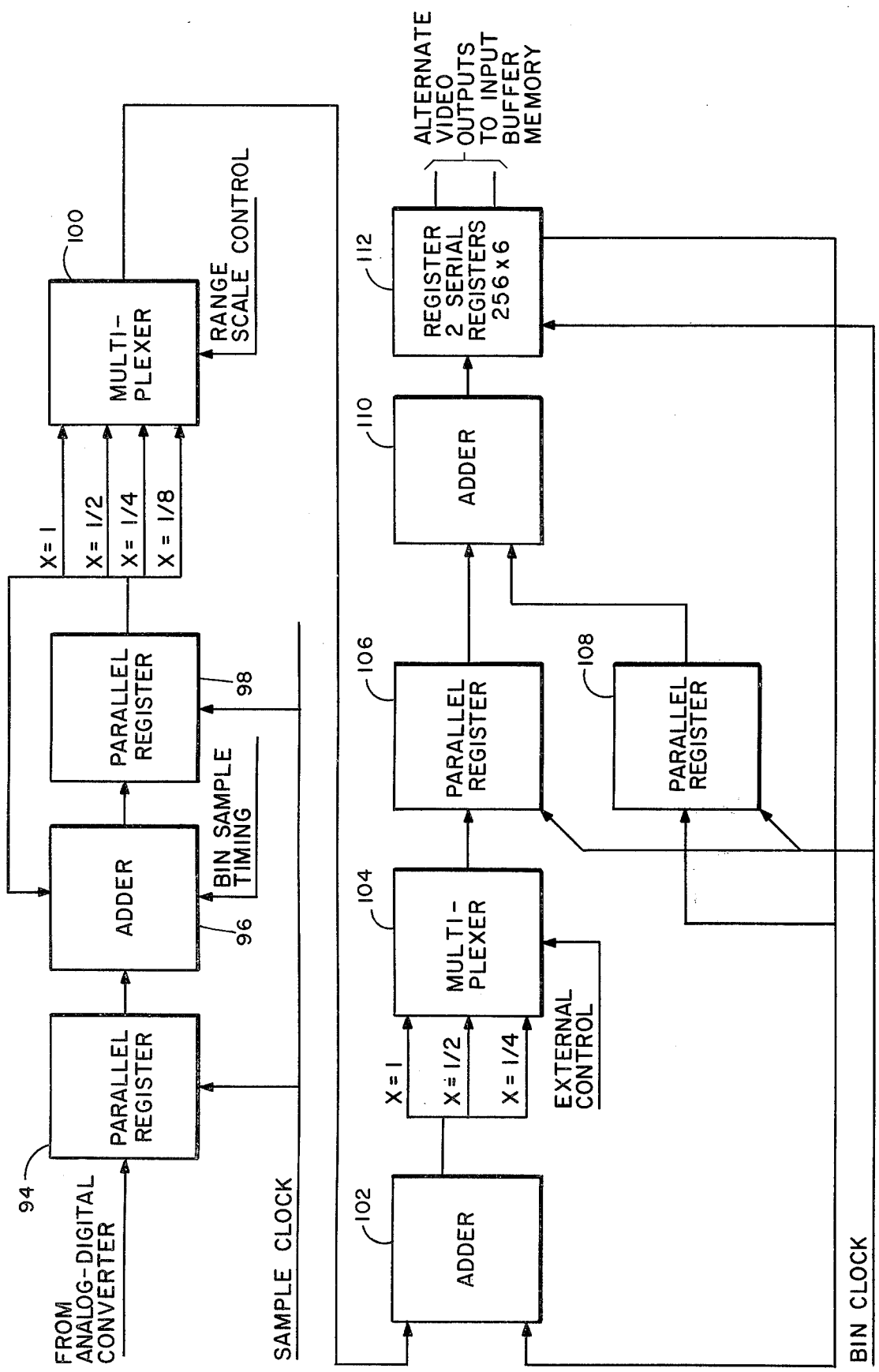
FIG. 7 is a block diagram of one embodiment of a range integrator and azimuth integrator as shown in FIG. 1.

Referring to FIG. 7, the digital data from the analog to digital input converter 16 is passed on to a range integrator which comprises a 4 bit parallel register controlled by the sample clock signal with an output of parallel register 94 being fed to an adder 96. At adder 96 a signal from a bin timing circuit is introduced and the output of adder 96 is sent to a parallel register 98 from which it is passed on to a multiplexer 100. The multiplexer 100 is subject to a range scale control to complete the function of the range integrator.

The output of the range integrator is passed on to the azimuth integrator at the time of each bin clock. At the same time the register 98 is cleared to start accumulating for the next bin.

The range integrator output is the output of multiplexer 100, which is fed to adder 102 of the azimuth integrator. The output of adder 102 is passed on to a multiplexer 104 which may be provided with a form of external control. The output of multiplexer 104 is passed on to a parallel register 106. A parallel register 108 is provided so that signals taken from the output of the azimuth integrator may be fed into parallel register 108 with the output of register 106 and 108 fed into an adder 110. Adder 110 performs the function of integrating and recirculating the information applied to its input and provides an output to the following serial register 112. The output of the following serial register 112 is sent on to input buffer memory 32.

Operation of the Scan Converter

The operation of the scan converter as shown in FIG. 2 of the drawing will now be explained in detail. For purposes of simplicity, the upper portion of the drawing of FIG. 2 including the blocks 16, 18, 20, 22, 32, 34, and 38 pass the radar information from the input to the output. Supporting functions are performed by the blocks 24, 26, 28, 30, 40, 42 and 44.

It should be considered that the circuits for carrying out the functions performed by the blocks 16, 18, 20, 22, 32, 34 and 38 are known in the art except as to those circuits more fully explained in the specification.

The scan converter to be described may readily be operated with the APQ-113 family of radars. However, since any radar set must have video timing signals and angle position signals available within the unit, it is possible to adapt the scan converter herein described to any ground mapping radar. In the following description, it should be noted that the scan converter obtains video, zero sync pulse, pre-sync pulse, azimuth limit data, range scale commands, ground/velocity mode commands and digital cursor range and azimuth signals from the radar receiver.

Radar video information is fed from the radar receiver to analog to digital converter 16 whereat the incoming signal is sampled responsive to signals from a sample clock at a 10 megahertz or slower rate and fed out of the analog to digital converter as a four bit digital number. The 4 bit digital number is passed on to the range integrator 18 wherein the difference between the data for each bin which may have 1, 2, 4 or 8 samples is averaged so that when the signal comes out of the range integrator it is the average of the samples in a bin corresponding to one dot. The output of the range integrator is fed to an azimuth integrator. The fitting of a polar coordinate signal format to the rectangular format of the main memory 32 results in a sample density which is very high near the vertex and progressively lower away from the vertex. For those dots near the vertex, this results in data being read into a dot more than once during a radar scan.

The azimuth integrator 20 integrates the incoming signal at the same range from one angle to the next, which corresponds from one radar sweep to the next radar sweep. This operation tends to smooth out the information which is in a dot as a result of several read ins to a dot as we go from one radar sweep to the next. The output from the azimuth integrator 18 is fed into the input buffer memory 20 in the same four bit format. The input buffer memory is functionally two sequential memories, each 512 words by 14 bits. The two memories of the input buffer memory may alternately accept 512 words of radar data every other radar sweep. As one of the memories of the input buffer memory is receiving data at its input, the alternate memory is furnishing the data stored therein to the main memory.

The radar data is supplied to the input buffer memory in uniform single steps of Y address. The data reaching the input buffer is combined to include four bits of amplitude, 9 bits of X address and a data valid bit. As each sample corresponds to a single Y step and the storage is sequential, the Y address may be reconstructed as the buffer is read.

It must be remembered that the size and organization of the input buffer 22 required that exactly one data point be collected for each increment of the Y dimension. Therefore, the frequency at which the samples are taken varies as the cosine of the antenna angle (consine $\theta$). This requirement is satisfied with a fixed number (512) of samples along the Y-dimension. The sampling rate is highest for data taken when the antenna is pointing straight ahead at an angle of 0° ($\cos\theta = 1$).

The timing method used in the implementing the invention makes the clock rate proportional to cosine $\theta$. The clock circuit contains a crystal oscillator operating at 41.443 MHz, and the clock circuit input is a binary digital representation of cosine $\theta$. A high-speed adder-accumulator (FIG. 4) is incremented by cosine $\theta$ on every clock pulse. The output of a higher state of the adder is used to generate the sample clock, such that when cosine $\theta$ is unity, the clock is divided by four. The result is a clock whose frequency is 10.361 MHz times cosine $\theta$. This clock will occur in uniform steps of 1/128 nautical mile in Y, and is used to help set the Y address.

When $\theta$ is greater than 45 degrees, the X and Y axes are interchanged. The samples are then uniform in steps of X. This interchanging is restored at the input of the Main Memory. The data then appears at the correct location on the television type display. The result of the transformation/restoration of axes is to keep the sample rate from dropping any lower than at $\theta = 45°$.

The X and Y locations of the data being processed is determined by the X and Y address counters. The counters are given the vertex location, $X_o$ and $Y_o$, before the start of each radar sweep. The counter is advanced by the cosine clock, which is used to trigger the analog to digital converter. A variable modulo countdown in the early stages of the counter allows for changes in range scaling.

The data being processed is thus passed through the input buffer memory 22, given the proper address and passed on to and written into the main memory at the address assigned to the data.

Writing the data from the input buffer memory 22 to the main memory 32 and reading data out of the main memory is under control of the memory controller 30. Writing the data into the memory is well known in the art and is therefor not detailed here. The main memory as hereinbefore shown is a megabit memory having 4 rows by 64 columns by 4 deep. Data for a series of dots forming a one-eighth portion of a line are read out in parallel from main memory 32 into a first output buffer memory. Upon an appropriate clock, the data stored in the first output buffer memory is transferred in a parallel fashion to the second output buffer memory. The first output buffer memory, relieved of the data stored therein is available for new data representative of the next one-eighth portion of a line from the main memory 32. At the same time, second output buffer memory starts sending the data stored therein to the output digital to analog converter 38. This process is repeated under control of the output timing and sync generator 40, taking eight full readings of the second output buffer memory to supply the data for writing one line on the television type display device.

Reading the data out of the second output buffer memory is properly timed to the television type display device scan the timing is under control of an output timing and sync generator. To maintain the correct aspect ratio, the output data rate for the television type display device is maintained at 12.75 Megahertz by means of an appropriate crystal oscillator. To derive the X coordinate, the cosine clock is used to drive an adder-accumulator which multiplies it by tangent $\theta$. The result is an enable pulse whose frequency is proportional to sine $\theta$. This enable pulse is used in conjunction with the cosine clock to step the X counter. The resulting steps in X are thus synchronized with the steps in Y and with the video data samples. The X counter is counted either up or down, depending on the sign of $\theta$.

The range of X and Y coordinates in the memory is 0 to 511. The X and Y counters are preset and scaled so they match the true coordinates of the video at the time the sample is taken and thus establish the basis for affixing a proper address to the data being processed. In the normal mode of operation, the vertex is at the bottom center of the screen. Therefore, in the normal mode, the initial values are $X_o = 256$, $Y_o = 0$.

It is possible to operate the desired display in an offset mode, under which condition the vertex can be almost anywhere, on or off the screen. Therefore, the range of values allowed in the X and Y counters may extend from −2,048 to +2,047. These numbers are scaled to the coordinate system of the screen. Then, during the radar sweep, only when both X and Y counters are between 0 and 511, the write gate logic 88 will enable the input buffer memory 22 to collect video data points for placement into the main memory 32.

The arithmetic processor 28 is utilized to compute the numerical information for cosine $\theta$, tangent $\theta$, the vertex coordinates $X_oY_o$, the cursor coordinates $X_cY_c$, and the end points of the unblanked sector for each line being scanned on the television display device.

Sector blanking is controlled by blocking the output from the digital to analog converter 38 during the required blanking time for extraneous matter outside the bounds of the scan signal.

The television type display is also expected to provide vertical and horizontal cursor information. The cursor information is provided by a cursor generator which provides for reading out an X cursor by reading one or more lines as having a fixed amplitude and reading out a Y cursor by having all dots in one or more Y columns with a fixed amplitude.

A particular display appearing on the television type display device may be frozen by disabling read-in to the main memory 32 which has been designated as a memory with non-destructive read-out.

From the description herein it will be obvious to those skilled in the art that although reference has been made to a particular television type scan at particular frequencies the invention readily may utilize different frequencies provided all timing circuits are modified to coordinate the functions being carried out. It is therefor intended that the claims herein be interpreted to reflect the spirit and scope of the disclosed invention.

What is claimed as new and desired to be secured by Letters Patent of the United States is:

1. In a radar system including an angularly scanned antenna and an associated receiver system,
   a scan converter for converting pulse-generated radar data received via said antenna — receiver system in polar coordinate scan format to an *x-y* cartesian coordinate format comprising, in combination:
   means for generating a cosine signal representative of the cosine of the antenna angle, said angle being defined by the angle between the polar coordinate radius along with said radar data is generated and a predetermined reference radius;

means operating in response to said cosine signal for generating a train of clock pulses for each radar pulse, the repetition rate of said pulses being a function of the cosine of said angle;

sampling means for generating a data signal representative of said radar in response to each of said clock pulses;

memory means having storage locations addressible in accordance with said x-y cartesian coordinate format;

means for loading said data signals into said memory means including a Y-address counter and means for incrementing said counter synchronism with said clock pulses, and means for reading said data signals out of said memory in a sequence compatible with said cartesian coordinate format.

2. The scan converter set forth in claim 1 wherein said sampling means includes analog-to-digital converter means for generating said data signals in digital form and wherein said memory means includes means for storing digital signals.

3. In a radar system including an angularly scanned antenna and an associated receiver system;

a scan converter for converting pulse-generated radar data received via said antenna — receiver system in polar coordinate scan format to an x-y cartesian coordinate format comprising, in combination:

means for generating a sine signal representative of the sine of the antenna angle, said angle being defined by the angle between the polar coordinate radius along with said radar data is generated and predetermined reference radius;

means operating in response to said sine signal for generating a train of clock pulses for each radar pulse, the repetition rate of said pulses being a function of the sine of said angle;

sampling means for generating a data signal representative of said radar in response to each of said clock pulses;

memory means having storage locations addressible in accordance with said X-Y cartesian cordinate format;

means for loading said data signals into said memory means including a X-address counter and means for incrementing said counter in synchronism with said clock pulses; and means for reading said data signals out of said memory in a sequence compatible with said cartesian coordinate format.

4. The scan converter set forth in claim 3 wherein said sampling means includes analog-to-digital converter means for generating said data signals in digital form and wherein said memory means includes means for storing digital signals.

* * * * *